US011965386B2

(12) United States Patent
Tenorio et al.

(10) Patent No.: US 11,965,386 B2
(45) Date of Patent: Apr. 23, 2024

(54) RISER BOLT TORQUE SYSTEM

(71) Applicant: Schlumberger Technology Corporation, Sugar Land, TX (US)

(72) Inventors: Harold Tenorio, Houston, TX (US); John Zahl, Kristiansand (NO); Jon Tyler, Houston, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 18/453,456

(22) Filed: Aug. 22, 2023

(65) Prior Publication Data
US 2023/0399900 A1   Dec. 14, 2023

Related U.S. Application Data

(62) Division of application No. 17/321,822, filed on May 17, 2021, now Pat. No. 11,767,721.

(51) Int. Cl.
*B23P 19/06* (2006.01)
*E21B 17/08* (2006.01)
*E21B 19/16* (2006.01)

(52) U.S. Cl.
CPC .......... *E21B 19/164* (2013.01); *B23P 19/061* (2013.01); *B23P 19/069* (2013.01); *E21B 17/085* (2013.01)

(58) Field of Classification Search
CPC .... E21B 19/164; E21B 17/085; E21B 19/004; E21B 19/161; E21B 19/165; B23P 19/061; B23P 19/069
See application file for complete search history.

(56) References Cited

U.S. PATENT DOCUMENTS

| 5,125,298 | A | 6/1992 | Smith |
| 7,281,451 | B2 | 10/2007 | Schulze Beckinghausen |
| 11,767,721 | B2* | 9/2023 | Tenorio ................ E21B 19/164 405/224.2 |
| 2002/0005092 | A1 | 1/2002 | Collins |
| 2005/0141967 | A1 | 6/2005 | Giles |
| 2011/0048649 | A1 | 3/2011 | Komatsu |
| 2012/0227977 | A1 | 9/2012 | Francis |
| 2015/0068767 | A1 | 3/2015 | Jahnke |
| 2016/0312550 | A1 | 10/2016 | Jonassen |

(Continued)

FOREIGN PATENT DOCUMENTS

WO   2015093970 A1   6/2015

OTHER PUBLICATIONS

International Search Report and Written Opinion issued in International Patent application PCT/US2022/028893 dated Aug. 31, 2022, 10 pages.

*Primary Examiner* — Ryan J. Walters
(74) *Attorney, Agent, or Firm* — Jeffrey D. Frantz

(57) ABSTRACT

Present embodiments relate to a riser bolt torque device that is configured to couple a first riser joint to a second riser joint to form a riser of a subsea drilling system. The riser bolt torque device includes a first arm and a second arm, multiple torque tools supported on the first arm and the second arm, and one or more actuators configured to drive the first arm and the second arm to pivot relative to one another from an open configuration to a closed configuration to enable alignment between the multiple torque tools and a flange of the first riser joint.

4 Claims, 13 Drawing Sheets

(56) References Cited

U.S. PATENT DOCUMENTS

| | | |
|---|---|---|
| 2018/0208283 A1 | 7/2018 | Munro |
| 2020/0001412 A1 | 1/2020 | Miyake |
| 2022/0364422 A1 | 11/2022 | Tenorio |

* cited by examiner

RISER BOLT TORQUE SYSTEM

CROSS-REFERENCE TO RELATED APPLICATIONS

The application is a divisional of U.S. patent application Ser. No. 17/321,822, filed on May 17, 2021, which is incorporated herein by reference in its entirety.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Natural resources have a profound effect on modern economies and societies. In order to meet the demand for such natural resources, numerous companies invest significant amounts of time and money in searching for, accessing, and extracting oil, natural gas, and other natural resources. Particularly, once a desired natural resource is discovered below the surface of the earth, drilling systems are often employed to access the desired natural resource. The drilling systems can be located onshore or offshore depending on the location of the desired natural resource. When located offshore, the drilling systems may include a riser that connects equipment at a sea floor to a rig at a sea surface.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

Figure 1:
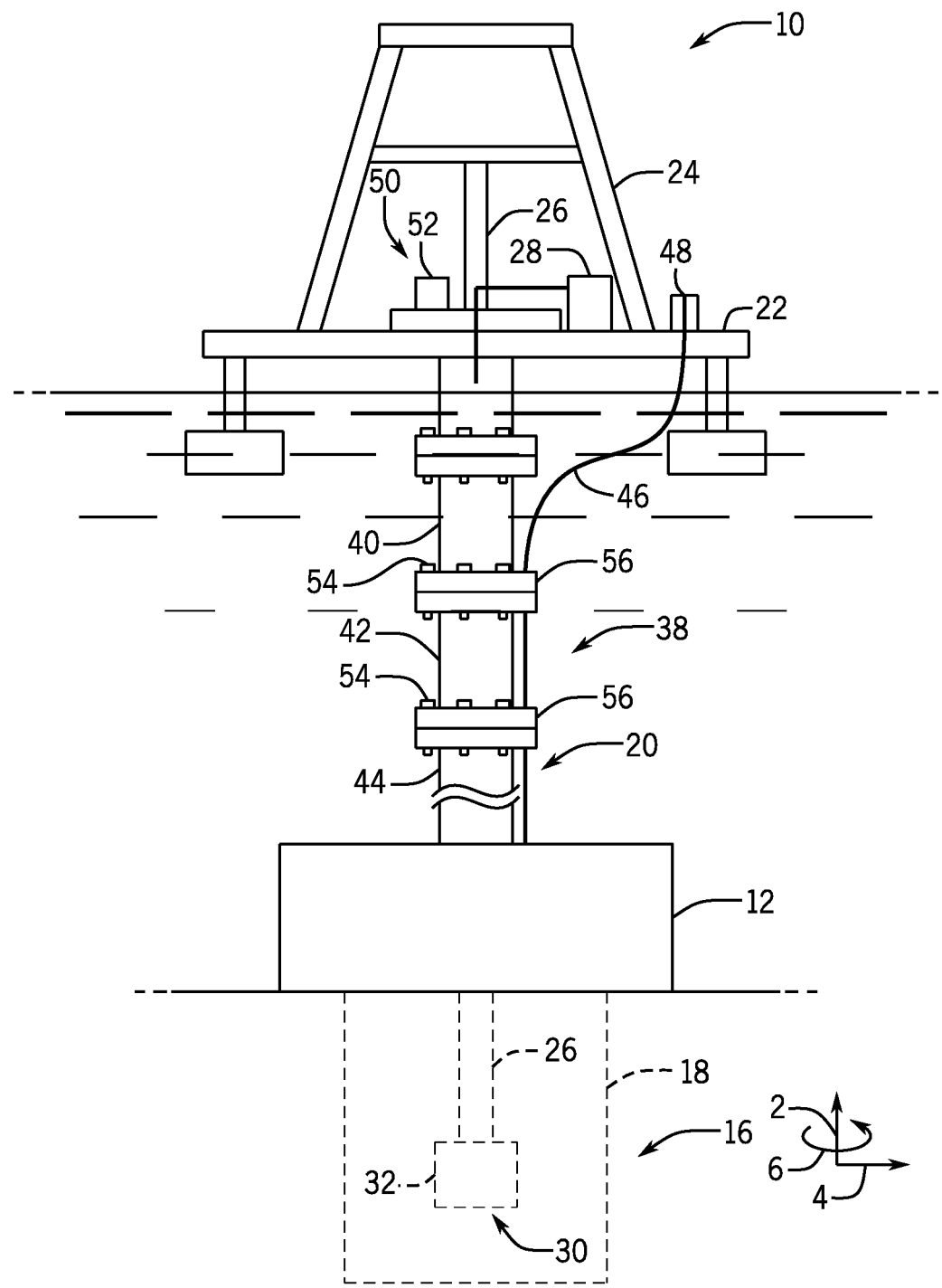
FIG. 1 is a schematic diagram of a drilling system, in accordance with an embodiment of the present disclosure.

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," "said," and the like, are intended to mean that there are one or more of the elements. The terms "comprising," "including," "having," and the like are intended to be inclusive and mean that there may be additional elements other than the listed elements. The use of "top," "bottom," "above," "below," and variations of these terms is made for convenience but does not require any particular orientation of the components relative to some fixed reference, such as the direction of gravity. The term "fluid" encompasses liquids, gases, vapors, and combinations thereof. Numerical terms, such as "first," "second," and "third" may be used to distinguish components to facilitate discussion, and it should be noted that the numerical terms may be used differently or assigned to different elements in the claims. The drawing figures are not necessarily to scale. Certain features and components herein may be shown exaggerated in scale and/or in somewhat schematic form. Some details may not be shown in the interest of clarity and conciseness.

A drilling system that is located offshore may include a drilling fluid system that is configured to circulate drilling fluid into and out of a wellbore to facilitate drilling the wellbore. For example, the drilling fluid system may provide a flow of the drilling fluid through a drill string as the drill string rotates a drill bit that is positioned at a distal end portion of the drill string. The drilling fluid may exit through one or more openings at the distal end portion of the drill string and may return toward a platform of the drilling system via an annular space that surrounds the drill string. In particular, the annular space may include a lower portion that is defined between the drill string and a casing that lines the wellbore, as well as an upper portion that is defined between the drill string and a riser that extends from equipment at a sea floor to the platform.

The riser may be formed from multiple riser joints that are connected end-to-end via respective flanges. For example, in order to join a first riser joint to a second riser joint, a first flange of the first riser joint and a second flange of a second riser joint may be aligned with one another. Then, multiple bolts may be inserted through first openings in the first flange of the first riser joint and through second openings in the second flange of the second riser joint. The multiple bolts may be tightened (e.g., torqued) to secure the first riser joint and the second riser joint to one another. This process may be repeated over and over for additional riser joints (e.g., more than 10, 20, 30, 40, 50, or more) until the riser joints are connected together to form the riser with a length that extends from the equipment at the sea floor to the platform.

Without the disclosed embodiments, an operator may physically handle and manipulate a tool to tighten the multiple bolts. As such, it may take a substantial amount of time and physical labor by the operator to form the riser. Advantageously, the disclosed embodiments provide a riser bolt torque system that includes a riser bolt torque device that is configured to tighten the multiple bolts. The riser bolt torque system may include a controller (e.g., electronic controller) that controls the riser bolt torque device to move to a centered position relative to the first riser joint, then to adjust to an engaged position to engage the multiple bolts, and then to apply torque to the multiple bolts to reach a final position in which the multiple bolts are tightened to secure the first riser joint and the second riser joint to one another. The riser bolt torque system may operate to join multiple riser joints together in this way to form the riser. It should also be appreciated that the riser bolt torque system may operate to loosen the multiple bolts to separate the multiple riser joints from one another to break up the riser.

With the foregoing in mind, FIG. 1 is a schematic diagram of an embodiment of a drilling system 10 that is configured to carry out drilling operations. The drilling system 10 may be an offshore system (e.g., subsea system) and may include a wellhead assembly 12 coupled to a mineral deposit via a well 16 having a wellbore 18.

The wellhead assembly 12 may include or be coupled to multiple components that control and regulate activities and conditions associated with the well 16. For example, the wellhead assembly 12 generally includes pipes, bodies, valves, and seals that enable drilling of the well 16, route produced minerals from the mineral deposit, provide for regulating pressure in the well 16, and provide for the injection of drilling fluids into the wellbore 18. As used herein, the wellhead assembly 12 may be considered to include or be coupled to a blowout preventer (BOP) stack that includes one or more ram BOPs and/or a lower marine riser package (LMRP) that includes one or more annular BOPs. A casing may provide structure for the wellbore 18 and may block collapse of the sides of the well 16 into the wellbore 18.

A riser 20 (e.g., annular structure; drilling riser) may extend between the wellhead assembly 12 (e.g., between the LMRP) and a platform 22. The platform 22 may include or support various components that facilitate operation of the drilling system 10, such as pumps, tanks, and power systems. The platform 22 may also include a derrick 24 that supports a tubular 26 (e.g., drill string), which may extend through the riser 20. A drilling fluid system 28 may direct the drilling fluid into the tubular 26, and the drilling fluid may exit through one or more openings at a distal end portion 30 of the tubular 26 and may return (along with cuttings and/or other substances from the well 16) toward the platform 22 via an annular space (e.g., between the tubular 26 and the casing that lines the wellbore 18; between the tubular 26 and the riser 20). A drill bit 32 may be positioned at the distal end portion 30 of the tubular 26. The tubular 26 may rotate within the riser 20 to rotate the drill bit 32, thereby enabling the drill bit 32 to drill and form the well 16.

As shown, the drilling system 10 may include multiple riser joints 38, such as a first riser joint 40, a second riser joint 42, a third riser joint 44, and so on. It should be appreciated that the riser 20 may include any number of riser joints 38 that enable the riser 20 to have a sufficient length to extend from the wellhead assembly 12 to the platform 22. It should also be appreciated that the riser 20 may include other features, such as a telescopic riser joint (TRJ) that is configured to enable heave of the platform 22 relative to the riser joints 38 (e.g., bare riser joints, such as the first riser joint 40, the second riser joint 42, and the third riser joint 44). The riser 20 may also support one or more auxiliary lines 46, which may deliver fluid (e.g., high-pressure fluid from a fluid source 48) to components of the wellhead assembly 12 and/or which may support power and/or control lines for components of the wellhead assembly 12, for example.

As discussed in more detail herein, a riser bolt torque system 50 that includes a riser bolt torque device 52 may be provided to efficiently connect the riser joints 38 to form the riser 20 and/or to disconnect the riser joints 38 to break up the riser 20. In particular, the riser bolt torque device 52 may be configured to tighten bolts 54 that extend through flanges 56 (e.g., annular flanges) of the riser joints 38 to thereby efficiently connect the riser joints 38 to form the riser 20 and/or to loosen the bolts 54 that extend through flanges 56 of the riser joints 38 to thereby efficiently to disconnect the riser joints 38 to break up the riser 20. The riser bolt torque device 52 may be supported on the platform 22, such as within a moon pool of the platform 22 or in any other suitable region that enables the riser bolt torque device 52 to reach the riser joints 38. The drilling system 10 and its components may be described with reference to the vertical axis 2 (or vertical direction), a radial axis 4 (or radial direction), and a circumferential axis 6 (or direction) to facilitate discussion.

Figure 2:
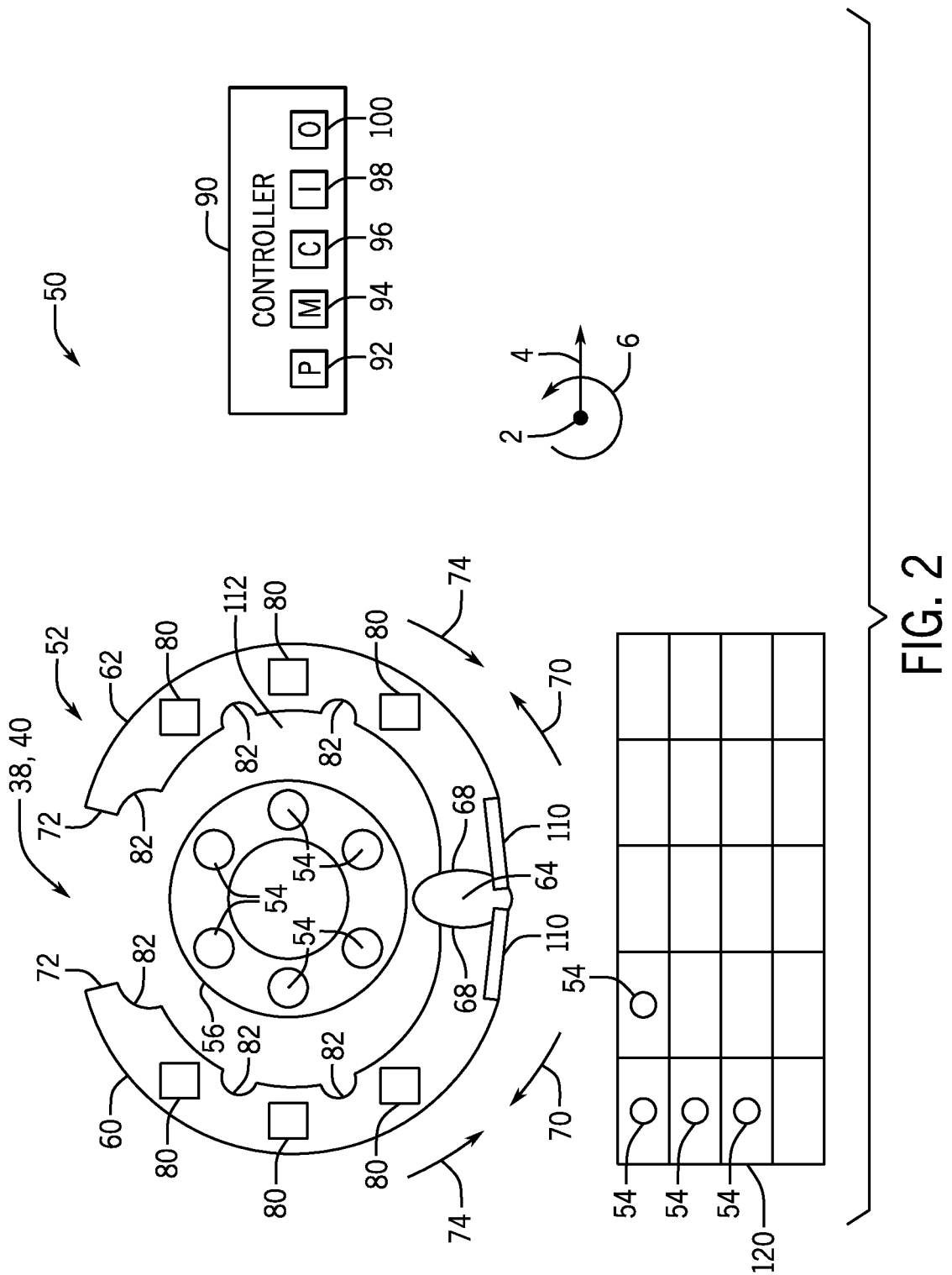
FIG. 2 is a schematic diagram of a riser bolt torque system that may be used to couple and/or to decouple riser joints of a riser of the drilling system of FIG. 1, in accordance with an embodiment of the present disclosure.

FIG. 2 is a schematic diagram of an embodiment of the riser bolt torque system 50 that includes the riser bolt torque device 52. The riser bolt torque device 52 is configured to adjust the bolts 54 that extend through openings in the flanges 56 to connect and/or to disconnect the riser joints 38. FIG. 2 shows one of the riser joints 38, which is labeled as the first riser joint 40 to facilitate discussion.

As shown, the riser bolt torque device 52 may include a first arm 60 (e.g., curved arm) and a second arm 62 (e.g., curved arm) that are configured to move relative to one another. In some embodiments, the first arm 60 and the second arm 62 are pivotally coupled to one another via a pivot 64 (e.g., pivot or hinge assembly) positioned between respective first ends 68 (e.g., proximal ends). In operation, the first arm 60 and the second arm 62 may rotate about the pivot 64 to adjust the riser bolt torque device 52 between an open configuration and a closed configuration. For example, the first arm 60 and the second arm 62 may rotate about the pivot 64 as shown by arrows 70 to bring respective second ends 72 (e.g., distal ends) toward one another (e.g., to decrease a separation distance between the second ends 72) to reach the closed configuration. In some embodiments, the respective second ends 72 may contact one another in the closed configuration (e.g., to form a complete ring). Additionally, the first arm 60 and the second arm 62 may rotate about the pivot 64 as shown by arrows 74 to pull the respective second ends 72 away from one another (e.g., to increase the separation distance between the second ends 72) to reach the open configuration. Thus, the first arm and the second arm 62 may be considered to form a clamshell arrangement or have a clamshell operation.

The first arm 60 and the second arm 62 may support multiple torque tools 80 (e.g., automated wrenches). Together, the first arm 60 and its torque tools may be considered a first arm assembly, and the second arm 62 and its torque tools 80 may be considered a second arm assembly. The multiple torque tools 80 may be spaced apart from one another and positioned to enable the multiple torque tools 80 to align with the bolts 54 when the riser bolt torque device 52 is in the closed configuration. While six bolts 54 and six torque tools 80 are shown to facilitate discussion, it should be appreciated that there may be any number of bolts 54 and any number of torque tools 80 (e.g., 1, 2, 3, 4, 5, 6, 7, 8, or more). Furthermore, the number of bolts 54 and the number of torque tools 80 may be the same or different. For example, there may be eight bolts 54 and four torque tools and the four torque tools 80 tighten four of the bolts 54 at one time and then move to tighten the remaining four of the bolts 54 at another time).

In some embodiments, the riser joints 38 may support the one or more auxiliary lines 46 that extend through openings in the flange 56 and/or that extend along radially-outer edges of the flange 56. Accordingly, the riser bolt torque device 52 may include one or more grooves 82 (e.g., cutouts), such as along radially-inner surfaces (e.g., curved surfaces; arcs) of the first arm 60 and the second arm 62, to accommodate the one or more auxiliary lines 46 and/or so as not to interfere with the one or more auxiliary lines in the closed configuration. As discussed in more detail herein, the multiple torque tools 80 may also be positioned to extend radially-inwardly of the first arm 60 and the second arm 62 to accommodate the one or more auxiliary lines 46.

The riser bolt torque system 50 may include a controller 90 (e.g., electronic controller) that includes a processor 92, a memory device 94, a communication device 96, an input device 98, and/or an output device 100. In operation, the controller 90 may receive an indication (e.g., from a sensor that monitors a position of the riser joints 38 and/or from an operator via the input device 98) to begin riser construction operations to join the riser joints 38. Then, the controller 90 may instruct one or more drives to move the riser bolt torque device 52 from a storage location (e.g., retracted behind a wall of the moon pool) to a working location (e.g., extended into the moon pool) that is proximate to a riser construction location at which the riser joints 38 will be joined to one another. For example, the controller 90 may instruct one or more drive wheels to rotate to move the riser bolt torque device 52 along a track between the storage location and the working location. In any case, as shown in FIG. 2, the controller 90 may move the riser bolt torque device 52 in the open configuration to a centered position in which the riser bolt torque device 52 at least partially circumferentially surrounds the first riser joint 40.

The controller 90 may receive an indication (e.g., from the sensor and/or from the operator) that the first riser joint 40 is properly aligned and is ready to be bolted to another riser joint (e.g., the second riser joint 42 of FIG. 1). In response, the controller 90 may instruct one or more actuators 110 (e.g., hydraulic; pneumatic; electric) to drive the first arm 60 and the second arm 62 to the closed position, which causes the torque tools 80 to be positioned vertically over the bolts 54. Then, the controller 90 may instruct the one or more drives (or the one or more actuators 110) to vertically lower the riser bolt torque device 52 and/or the torque tools 80 toward the bolts 54 to reach an engaged position in which the torque tools (e.g., sockets of the torque tools) engage the bolts 54. Then, the controller 90 may instruct the torque tools 80 to apply torque to tighten the bolts 54 to thereby secure the first riser joint 40 to another riser joint.

After the first riser joint 40 is joined to another riser joint in this way, the controller 90 may instruct the one or more drives to vertically raise the riser bolt torque device 52 and/or the torque tools 80 away from the bolts 54 to reach a disengaged position in which the torque tools 80 are separated from the bolts 54. Then, the controller 90 may instruct the one or more actuators 110 to drive the first arm 60 and the second arm 62 to the open position to enable the next riser joint to be positioned to couple to an opposite end of the first riser joint 40. This process may be repeated over and over to couple multiple riser joints to one another to form the riser 20 of FIG. 1. It should be appreciated that the riser bolt torque device 52 may remain in the open configuration in the centered position as the next riser joint is aligned (e.g., fed through an interior space 112 defined between the first arm 60 and the second arm 62 of the riser bolt torque device 52). Alternatively, the riser bolt torque device 52 may be removed (e.g., withdrawn; offset) from the centered position to enable the next riser joint to be aligned with the first riser joint and then the riser bolt torque device 52 may be returned to the centered position once the next riser joint is aligned with the first riser joint 40.

In some embodiments, the bolts 54 may be positioned in the openings of the flange 56 prior to positioning the first riser joint 40 at the riser construction location and/or by another device (e.g., other than the riser bolt torque device 52) while the first riser joint 40 is at the riser construction location. However, in some embodiments, the riser bolt torque device 52 may be configured to retrieve the bolts 54 from a magazine 120 (e.g., storage rack), insert the bolts 54 into the openings in the flange 56 (e.g., as the riser bolt torque device 52 is moved vertically into engagement with the first riser joint 40), and then tighten the bolts 54 as described herein. In such cases, the magazine 120 may be positioned to be accessible to the torque tools 80 of the riser bolt torque device 52 via pivoting movement of the riser bolt torque device 52 and/or the magazine 120 may include robotic arms or other features that hand the bolts 54 to the torque tools 80 of the riser bolt torque device 52, for example.

It should be appreciated that the controller 90 may be a dedicated controller for the riser bolt torque system 50 and/or the controller 90 may be part of or include a distributed controller with one or more electronic controllers in communication with one another to carry out the various techniques disclosed herein. The processor 92 may also include one or more processors configured to execute software, such as software for processing signals and/or controlling the components of the riser bolt torque system 50. The memory device 94 disclosed herein may include one or more memory devices (e.g., a volatile memory, such as random access memory [RAM], and/or a nonvolatile memory, such as read-only memory [ROM]) that may store a variety of information and may be used for various purposes. For example, the memory device 94 may store processor-executable instructions (e.g., firmware or software) for the processor 92 to execute, such as instructions for processing signals and/or controlling the components of the riser bolt torque system 50.

It should be appreciated that the controller 90 may include various other components, such as the communication device 96 that is capable of receiving instructions from various other devices (e.g., a remote computing system) and/or communicating data (e.g., a current configuration and/or a current position of the riser bolt torque device 52) to the various other devices. Furthermore, the input device 98 may include one or more keys, switches, microphones, or physical devices that may be operated/manipulated by an operator to provide an input to control the riser bolt torque system 50. The output device 100 may include one or more displays (e.g., screens) to provide visual outputs for the operator and/or one or more speakers to provide audible outputs for the operator. In some embodiments, the output device 100 may also be the input device 98 and/or operate as an additional input device (e.g., touchscreen display). The riser bolt torque system 50 may include various other components, such as sensors to monitor the operations at the riser construction location and/or cameras to obtain images of the riser construction location. In such cases, sensor data and/or the images may be provided via the output device 100. In this way, the operator may be positioned remotely from the riser construction location (e.g., outside of the moon pool; away from the platform 22 of FIG. 1) and may provide inputs and/or receive feedback as the riser bolt torque system 50 couples the riser joints 38 and/or decouples the riser joints 38.

With the foregoing in mind, FIGS. 3-13 illustrate an embodiment of the riser bolt torque device 52 in various configurations and various positions. FIGS. 3-13 also show portions of two riser joints 38, which are labeled as the first riser joint 40 and the second riser joint 42 to facilitate discussion.

Figure 3:
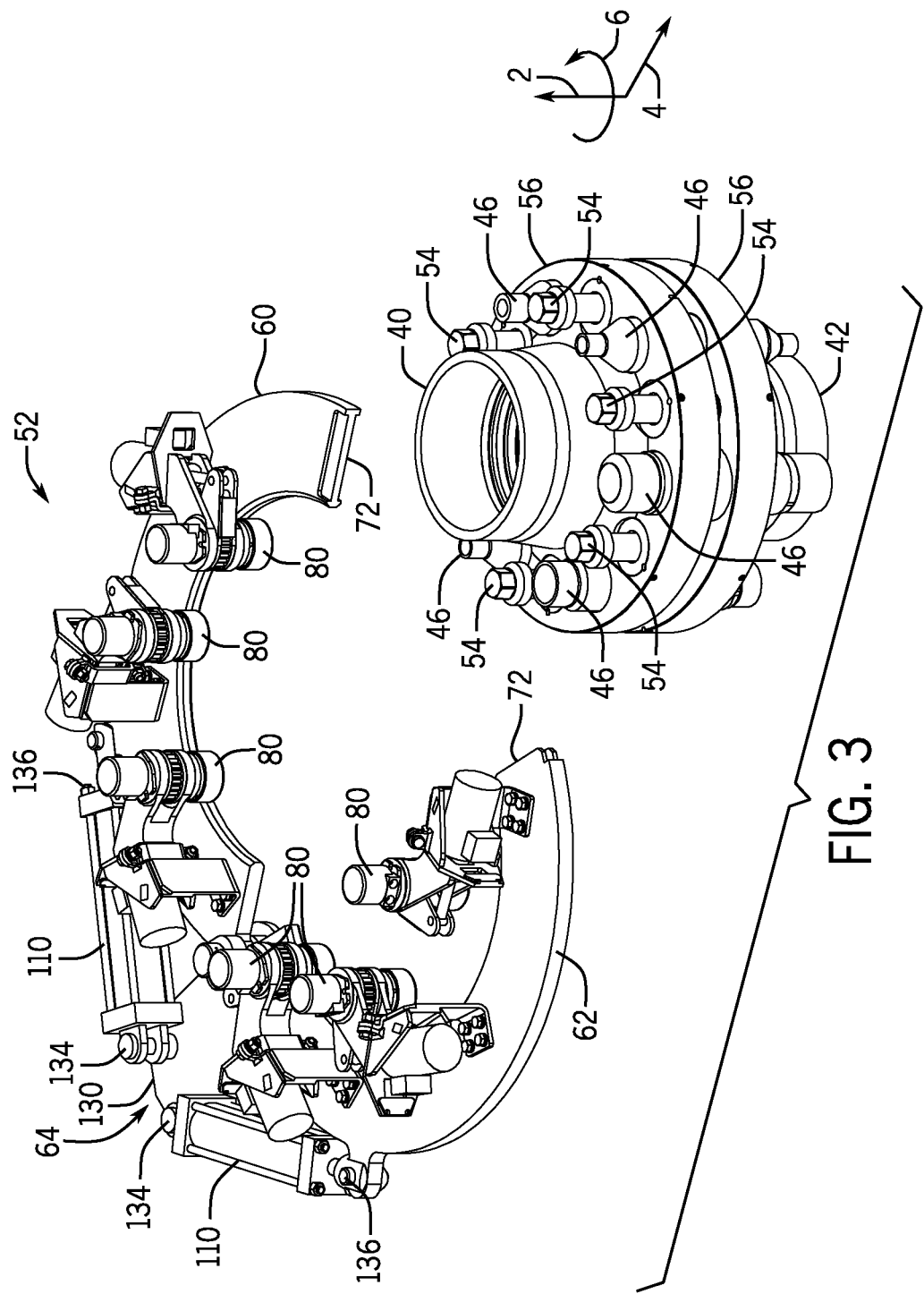
FIG. 3 is a perspective view of a riser bolt torque device that may be used as part of the riser bolt torque system of FIG. 2, in accordance with an embodiment of the present disclosure.
Figure 4:
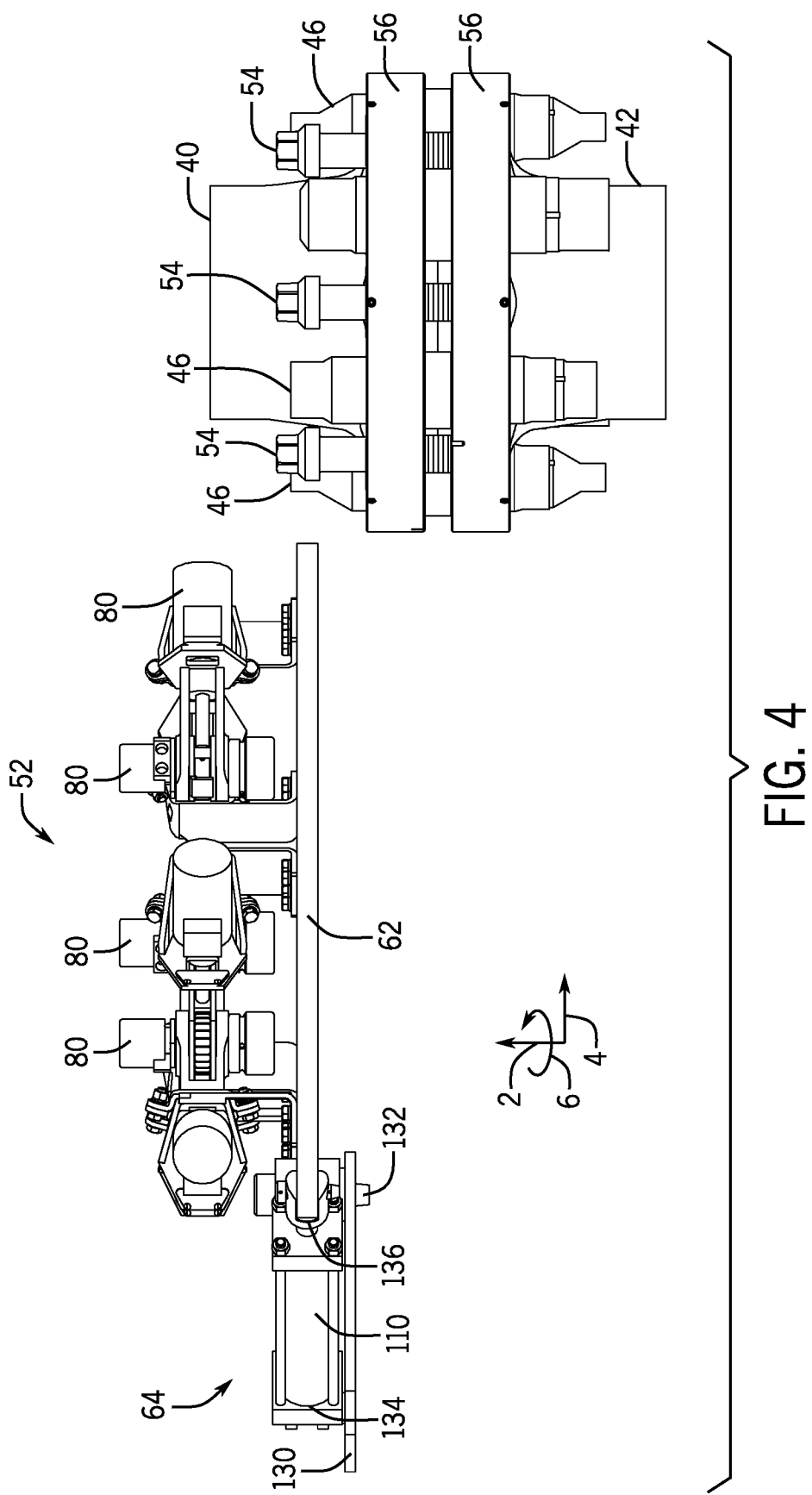
FIG. 4 is a side view of the riser bolt torque device of FIG. 3, in accordance with an embodiment of the present disclosure.
Figure 5:
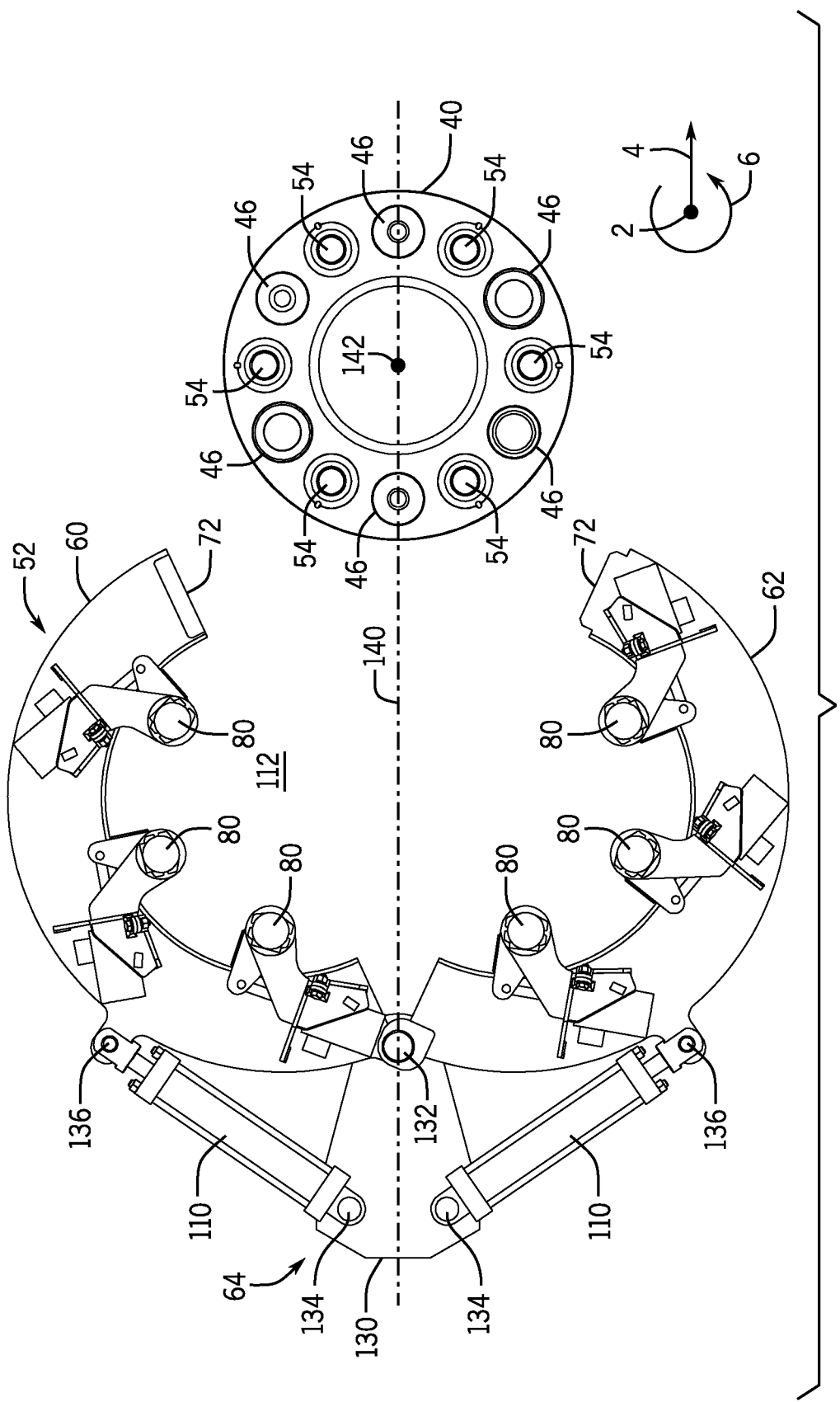
FIG. 5 is a top view of the riser bolt torque device of FIG. 3, in accordance with an embodiment of the present disclosure.

In particular, FIGS. 3-5 illustrate the riser bolt torque device 52 in the open configuration and in an offset position (e.g., offset vertically and radially) from the two riser joints 38. The riser bolt torque device 52 may be in the open configuration and the offset position prior to the riser construction operations and/or as the first riser joint 40 is moved into alignment with the second riser joint 42, for example. As shown, the bolts 54 may extend through respective openings formed in the respective flange 56 of the first riser joint 40 and through respective openings formed in the respective flange 56 of the second riser joint 42. The one or more auxiliary lines 46 may also extend through respective openings formed in the respective flange 56 of the first riser joint 40 and through respective openings formed in the respective flange 56 of the second riser joint 42.

With reference to FIGS. 3-5, the riser bolt torque device 52 includes the first arm 60 and the second arm 62, which are pivotally coupled to one another via the pivot 64. The pivot 64 may include a plate 130 (e.g., support; bracket) and at least one pin 132, and first ends 134 of the actuators 110 are coupled to the plate 130. Second ends 136 of the actuators 110 are coupled to the first arm 60 and the second arm 62 such that actuation of the actuators 110 drives the first arm 60 and the second arm 62 to pivot about the at least one pin 132 relative to the plate 130. In particular, extension of the actuators 110 drives the first arm 60 and the second arm 62 to pivot to bring the respective second ends 72 closer together to adjust the riser bolt torque device 52 to the closed configuration, while retraction of the actuators 110 drives the first arm 60 and the second arm 62 to drive the respective second ends 72 further apart to adjust the riser bolt torque device 52 to the open configuration.

Figure 6:
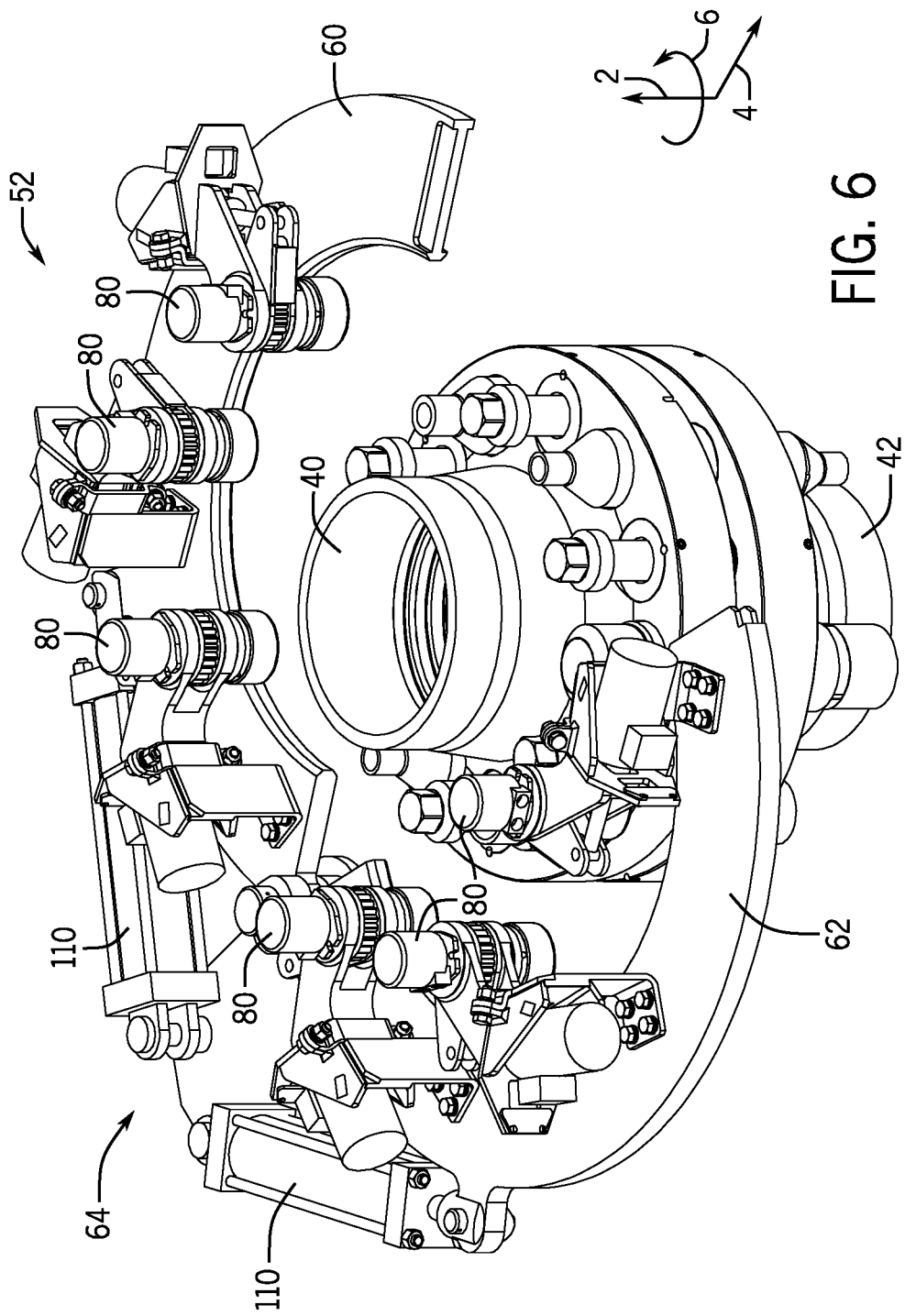
FIG. 6 is a perspective view of the riser bolt torque device of FIG. 3, wherein the riser bolt torque device is in a centered position, in accordance with an embodiment of the present disclosure.
Figure 7:
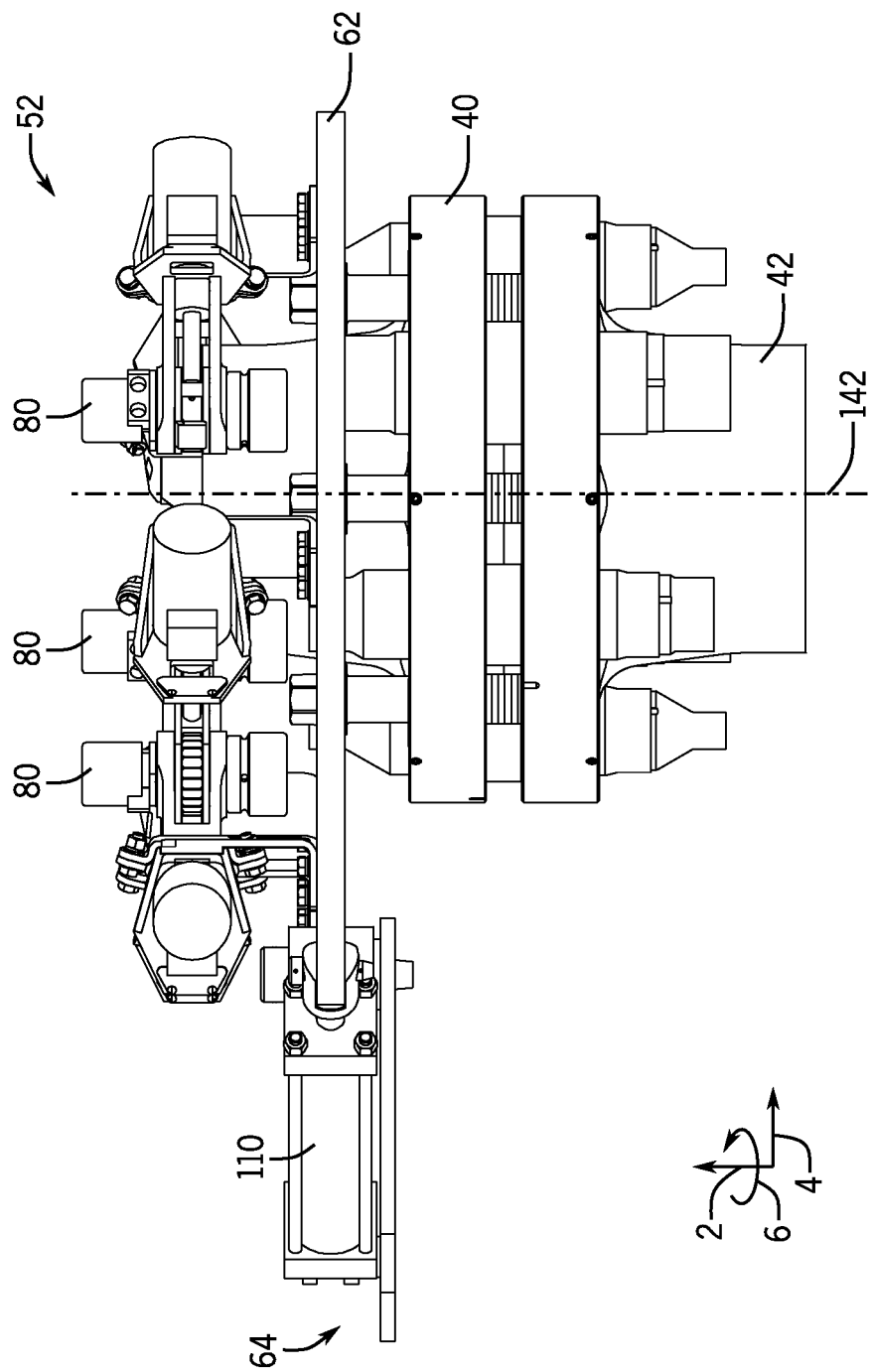
FIG. 7 is a side view of the riser bolt torque device of FIG. 3, wherein the riser bolt torque device is in the centered position, in accordance with an embodiment of the present disclosure.
Figure 8:
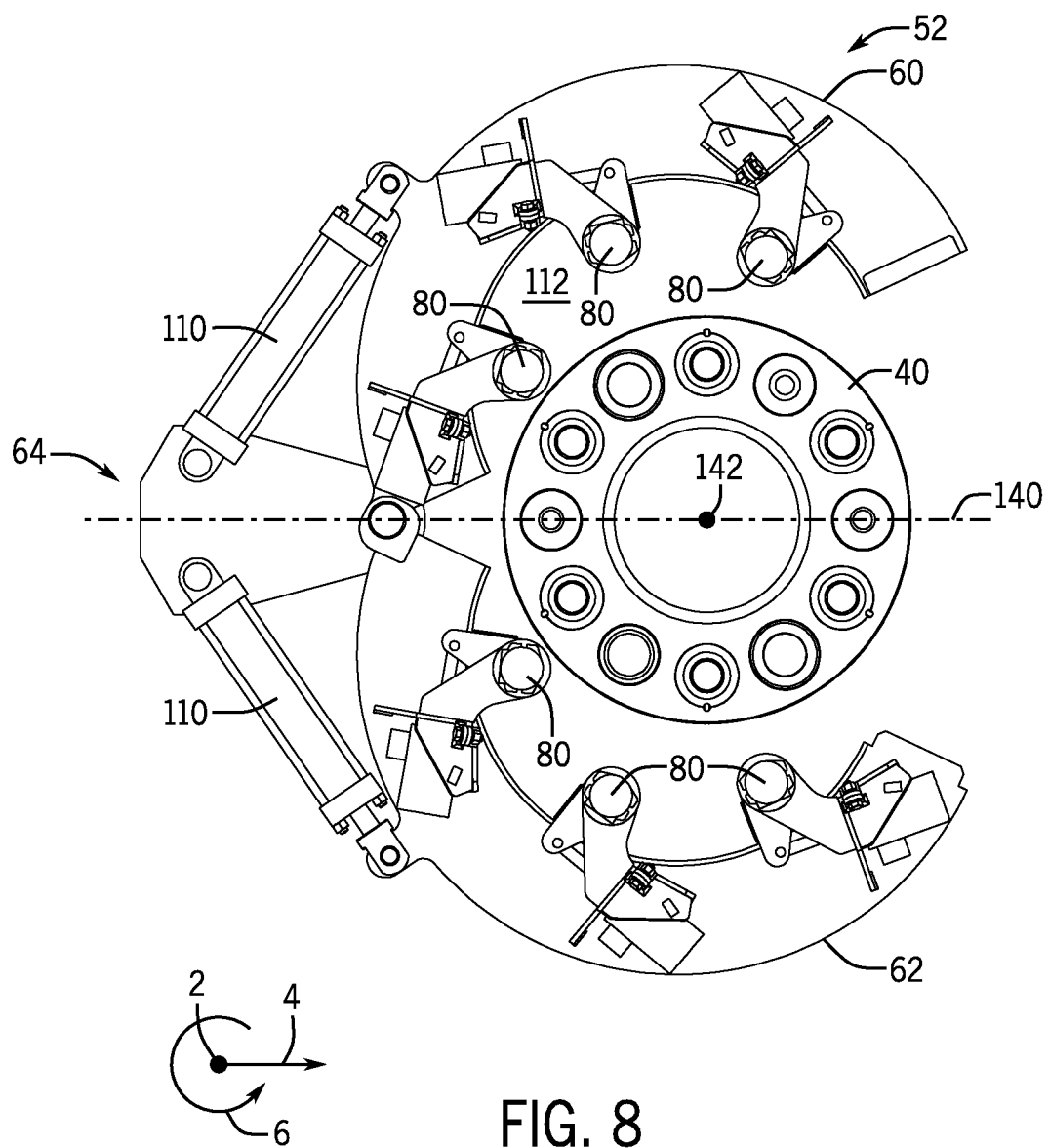
FIG. 8 is a top view of the riser bolt torque device of FIG. 3, wherein the riser bolt torque device is in the centered position, in accordance with an embodiment of the present disclosure.

However, prior to adjusting from the open configuration to the closed configuration, the riser bolt torque device 52 may be moved from the offset position shown in FIGS. 3-5 to a centered position shown in FIGS. 6-8. In particular, with reference to FIG. 5, the riser bolt torque device 52 may be aligned with the first riser joint 40 such that a device center axis 140 (e.g., that extends radially through the pin 132) intersects a riser center axis 142 (e.g., that extends vertically through the first riser joint 40). Then, with reference to FIGS. 6-8, the riser bolt torque device 52 may be driven toward the first riser joint 40 (e.g., the pin 132 is closer to the riser center axis 142) until the first arm 60 and the second arm 62 at least partially surround the first riser joint 40 (e.g., the first riser joint 40 extends through the interior space 112 defined between the first arm 60 and the second arm 62). In this way, the riser bolt torque device 52 is no longer offset radially relative to the first riser joint 40; however, the riser bolt torque device 52 may remain offset vertically (e.g., above) relative to the first riser joint 40.

Figure 9:
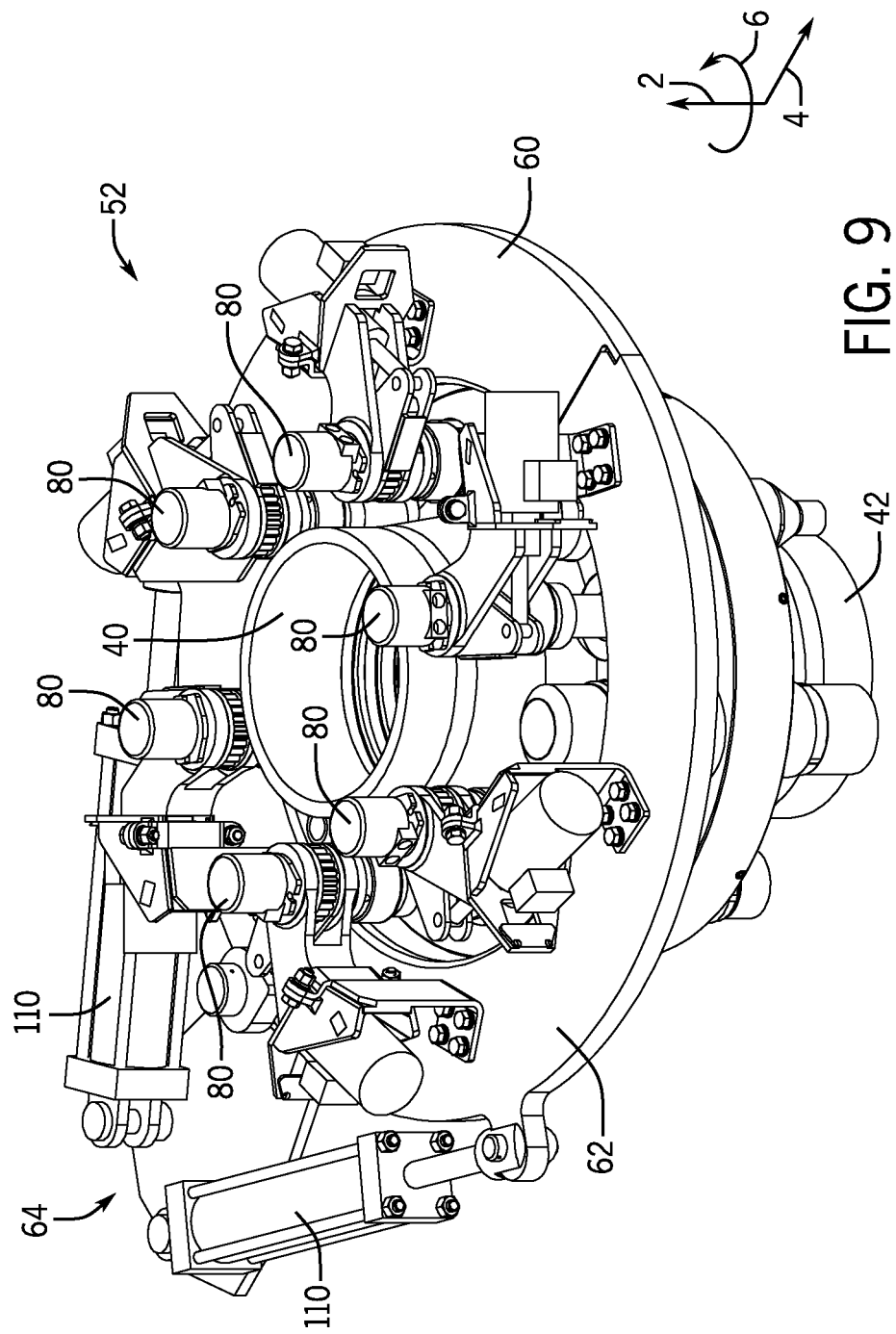
FIG. 9 is a perspective view of the riser bolt torque device of FIG. 3, wherein the riser bolt torque device is in an engaged position, in accordance with an embodiment of the present disclosure.
Figure 10:
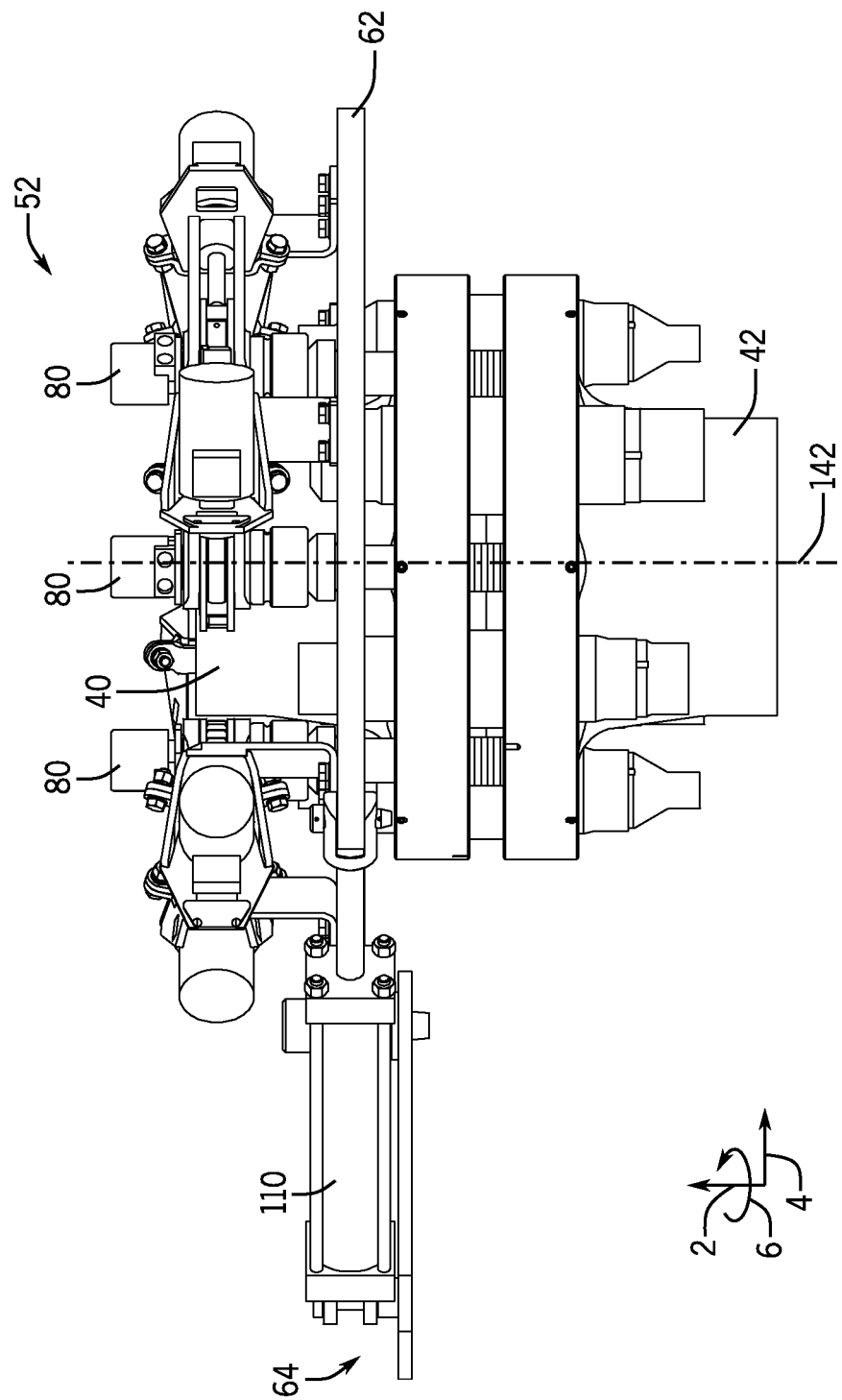
FIG. 10 is a side view of the riser bolt torque device of FIG. 3, wherein the riser bolt torque device is in the engaged position, in accordance with an embodiment of the present disclosure.
Figure 11:
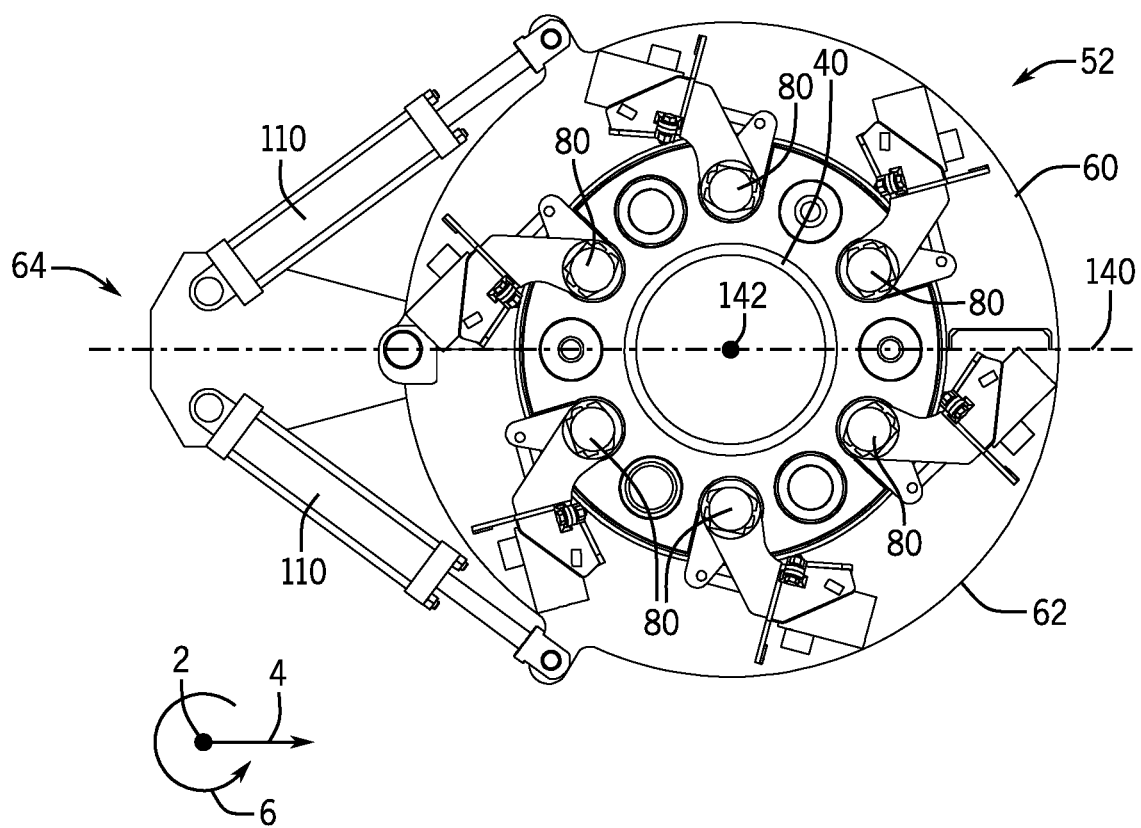
FIG. 11 is a top view of the riser bolt torque device of FIG. 3, wherein the riser bolt torque device is in the engaged position, in accordance with an embodiment of the present disclosure.

Then, while the riser bolt torque device 52 is in the centered position and offset vertically from the first riser joint 40, the actuators 110 may be actuated (e.g., extended) to drive the first arm 60 and the second arm 62 to the closed configuration as shown in FIGS. 9-11. This may cause each of the torque tools 80 to be positioned vertically above (e.g., aligned with) a respective bolt 54. Also, because the torque tools 80 extend radially-inwardly from the first arm 60 and the second arm 62, the first arm 60 and the second arm 62 may not contact or otherwise interfere with the one or more auxiliary lines 46 in the closed configuration.

Figure 12:
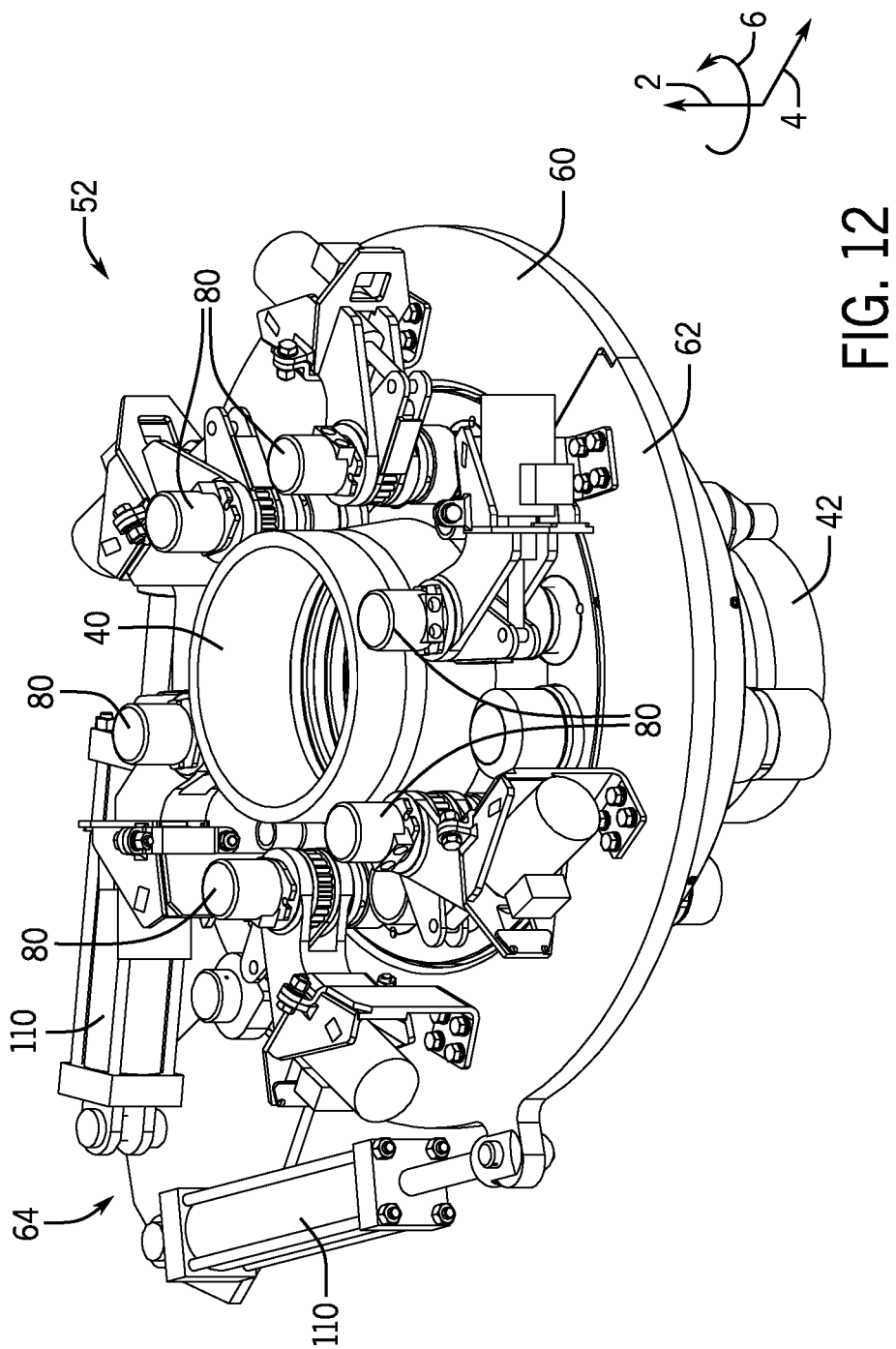
FIG. 12 is a perspective view of the riser bolt torque device of FIG. 3, wherein the riser bolt torque device is in a final position after tightening bolts, in accordance with an embodiment of the present disclosure.
Figure 13:
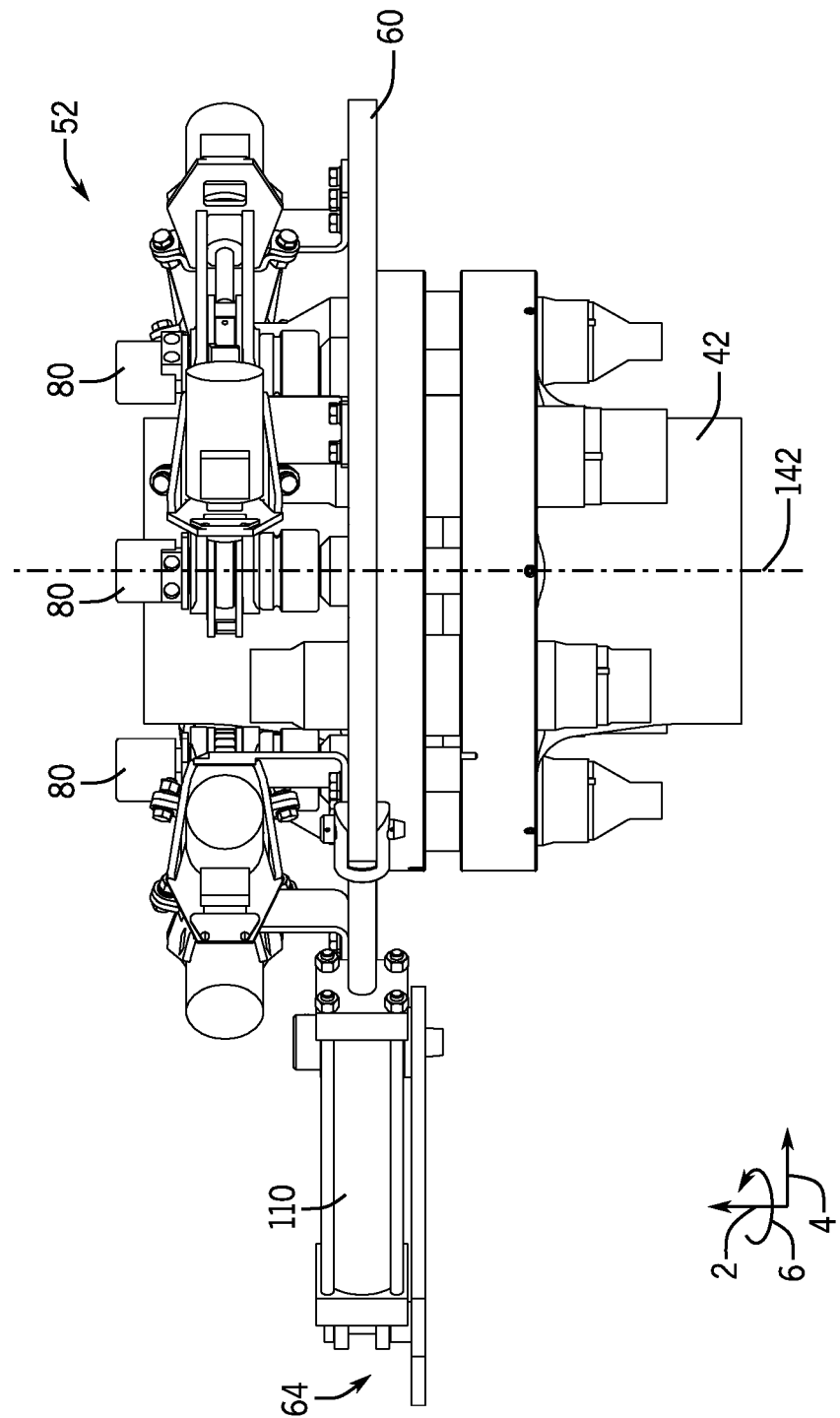
FIG. 13 is a side view of the riser bolt torque device of FIG. 3, wherein the riser bolt torque device is in the final position after tightening the bolts, in accordance with an embodiment of the present disclosure.

Once the riser bolt torque device 52 is in the closed configuration about the first riser joint 40 (e.g., circumferentially surrounds the first riser joint 40), the riser bolt torque device 52 and/or the torque tools 80 may be lowered to an engaged position in which the torque tools 80 engage the bolts 54 (e.g., sockets of the torque tools 80 receive and engage the bolts 54). Then, the torque tools 80 may be controlled to apply torque to the bolts 54 to tighten the bolts 54 to secure the first riser joint 40 to the second riser joint 42. The riser bolt torque device 52 may reach a final position, as shown in FIGS. 12 and 13, as the bolts 54 are tightened in this way.

After the first riser joint 40 is joined to another riser joint in this way, the riser bolt torque device 52 and/or the torque tools 80 may be raised vertically from the bolts 54 to reach a disengaged position in which the torque tools 80 are separated from the bolts 54. Then, the one or more actuators 110 may be actuated to drive the first arm 60 and the second arm 62 to the open position to enable the next riser joint to be positioned to couple to an opposite end of the first riser joint 40. This process may be repeated over and over to couple multiple riser joints to one another to form the riser 20 of FIG. 1. As noted herein, it should be appreciated that the riser bolt torque device 52 may remain in the open configuration in the centered position as the next riser joint is aligned (e.g., fed through an interior space 112 defined between the first arm 60 and the second arm 62 of the riser bolt torque device 52). Alternatively, the riser bolt torque device 52 may be removed from the centered position (e.g., withdrawn to the offset position) to enable the next riser joint to be aligned with the first riser joint 40, and then the riser bolt torque device 52 may be returned to the centered position once the next riser joint is aligned with the first riser joint 40.

As noted above, the riser bolt torque device 52 may also be operated to loosen the bolts 54 to separate the first riser joint 40 from the second riser joint 42 to break up the riser 20 of FIG. 1. For example, the first riser joint 40 may be lifted to be accessible to the riser bolt torque device 52. Then, the riser bolt torque device 52 may be adjusted and moved as described herein (e.g., from the offset position to the engaged position, and from the open configured to the closed configuration) to engage the bolts 54 of the first riser joint 40. Then, the riser bolt torque device 52 may apply torque to loosen the bolts 54 to enable separation of the first riser joint 40 from the second riser joint 42. Then, the riser bolt torque device 52 may be adjusted and moved as described herein (e.g., from the closed configured to the open configuration and/or from the engaged position to the offset position) to enable the first riser joint 40 to be separated from the second riser joint 42 and/or to enable the second riser joint 42 to be lifted to be accessible to the riser bolt torque device 52. This process may be repeated over and over until all of the riser joints of the riser are separated from one another.

It should be appreciated that all of the features discussed above with respect to FIGS. 1-13 may be combined in any suitable manner. While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is intended to cover all modifications, equivalents, and alternatives falling within the spirit and scope of the disclosure as defined by the following appended claims.

The invention claimed is:

1. A method of operating a riser bolt torque system, the method comprising:
adjusting a riser bolt torque device from a radially-offset position to a centered position relative to a first riser joint;
adjusting the riser bolt torque device from an open configuration to a closed configuration by pivoting a first arm and a second arm of the riser bolt torque device toward one another about a same pivot point;
adjusting a plurality of torque tools of the riser bolt torque device to engage a plurality of bolts that extend through the first riser joint; and
operating the plurality of torque tools to apply torque to the plurality of bolts to couple the first riser joint to a second riser joint to extend a riser of a subsea drilling system.

2. The method of claim 1, further comprising:
adjusting the plurality of torque tools of the riser bolt torque device to disengage from the plurality of bolts that extend through the first riser joint; and
adjusting the riser bolt torque device from the closed configuration to the open configuration by pivoting the first arm and the second arm of the riser bolt torque device away from one another.

3. The method of claim 2, further comprising:
aligning an additional riser joint with the first riser joint;
adjusting the riser bolt torque device from the open configuration to the closed configuration by pivoting the first arm and the second arm of the riser bolt torque device toward one another;
adjusting the plurality of torque tools of the riser bolt torque device to engage a plurality of additional bolts that extend through the additional riser joint; and
operating the plurality of torque tools to apply torque to the plurality of additional bolts to couple the additional riser joint to the first riser joint to extend the riser of the subsea drilling system.

4. The method of claim 1, further comprising operating the plurality of torque tools to apply torque to the plurality of bolts to unfasten the first riser joint from the second riser joint to break up the riser of the subsea drilling system.

\* \* \* \* \*